(12) United States Patent
Malm

(10) Patent No.: US 12,196,126 B2
(45) Date of Patent: Jan. 14, 2025

(54) METHOD, CONTROL SYSTEM AND EJECTOR SYSTEM FOR INTRODUCING VENT GAS TO A UNIT

(71) Applicant: REM Technology Inc., Calgary (CA)

(72) Inventor: Howard Malm, Coquitlam (CA)

(*) Notice: Subject to any disclaimer, the term of this patent is extended or adjusted under 35 U.S.C. 154(b) by 78 days.

(21) Appl. No.: 18/118,786

(22) Filed: Mar. 8, 2023

(65) Prior Publication Data

US 2023/0287832 A1    Sep. 14, 2023

Related U.S. Application Data

(60) Provisional application No. 63/317,918, filed on Mar. 8, 2022.

(51) Int. Cl.
| | |
|---|---|
| *F02B 43/12* | (2006.01) |
| *F02C 7/232* | (2006.01) |
| *F02C 9/26* | (2006.01) |

(52) U.S. Cl.
CPC .............. *F02B 43/12* (2013.01); *F02C 7/232* (2013.01); *F02C 9/263* (2013.01); *F02B 2201/04* (2013.01)

(58) Field of Classification Search
CPC ...... F02B 43/12; F02B 2201/04; F02C 7/232; F02C 9/263; F02C 3/22; F02C 7/22; F05D 2260/601
See application file for complete search history.

(56) References Cited

U.S. PATENT DOCUMENTS

| | | | |
|---|---|---|---|
| 6,315,000 B1 | 11/2001 | Goodyear | |
| 6,418,957 B1 | 7/2002 | Goodyear | |
| 8,100,671 B2 | 1/2012 | Botros et al. | |
| 8,113,181 B2 | 2/2012 | Malm | |
| 8,235,029 B2 | 8/2012 | Malm | |
| 8,382,469 B2 * | 2/2013 | Malm | F02B 43/10 431/115 |
| 2021/0364389 A1 * | 11/2021 | Malm | G01N 33/0036 |

* cited by examiner

*Primary Examiner* — Xiao En Mo
(74) *Attorney, Agent, or Firm* — Stevens & Showalter LLP

(57) ABSTRACT

Disclosed herein are methods, control systems and ejector systems related to introducing combustible vent gas to a unit using the combustible vent gas as a fuel, and/or to a gas compressor. Certain embodiments have a combustible gas provided to the unit through a first fuel line having a control valve to control the flow of the combustible gas. A portion of the combustible gas is selectively flowed to a second fuel line having a control valve to control the flow of combustible gas in the second fuel line. The flow of combustible gas in the second fuel serves as a primary flow to an ejector. The secondary flow to the ejector is vent gas. The output from the ejector is recombined with the flow in the first fuel line. Various control methodologies are possible using the control valves, vent gas flow and/or pressure of fuel to the unit.

24 Claims, 11 Drawing Sheets

METHOD, CONTROL SYSTEM AND EJECTOR SYSTEM FOR INTRODUCING VENT GAS TO A UNIT

CROSS-REFERENCE TO RELATED APPLICATIONS

The present application claims priority to U.S. Provisional Patent Application No. 63/317,918, filed on Mar. 8, 2022, the entire contents of which is incorporated by reference herein for all purposes.

INTRODUCTION

This invention relates to techniques for recovering vent gas, and more particularly, to methods, control systems and ejector systems for introducing vent gas to a unit.

BACKGROUND

Vent gas are combustible gasses that are intentionally released from an industrial process or facility because of difficulty recycling these gasses into the industrial process or recovering the gasses for further use. Methane is particularly problematic vent gas because it is a potent greenhouse gas having a Global Warming Potential ("GWP") of roughly some 25 times that of carbon dioxide per unit mass over a 100-year period. Therefore, the venting of methane may contribute strongly to the total greenhouse gas emissions from a given process or facility.

Various approaches have been proposed to reduce vented gas, and in particular vented methane, from industrial processes or facilities. For example, U.S. Pat. Nos. 8,113,181, 8,235,029 and 8,382,469 to Malm describe methods and apparatuses related to introducing vent gases to a combustion engine, for example, by adding the atmospheric pressure vented gas to the intake air supply whereby the combustible components of the vented gas displace some of the normal engine fuel. In some examples, the destruction rate of a methane component of the vented gas may be very high because there is no intake air scavenging whereby the incoming air is used to sweep out the exhaust gases after combustion.

But for gas turbines, and for other engine designs where some of the intake air is used for scavenging and thereby bypasses combustion, adding the atmospheric pressured vent gas to the intake air leads to incomplete combustion of the vent gases. Hence, it may be beneficial to develop a method of pressurizing the atmospheric pressure vent gas sufficiently to add to the pressurized vent gas to a pressurized engine or turbine fuel supply.

A non-mechanical method of collecting and compressing the vent gas is by use of ejectors, also known as eductors, whereby the Venturi effect is used to reintroduce vent gases to the flowing pressurized gas. To collect the vent gases these ejectors may operate in the critical flow regime where, for natural gas, the ratio of the inlet to exit pressures exceeds 1.83. The use of an ejector for the recovery and reintroduction of vent gases has been described in U.S. Pat. Nos. 6,315,000 and 6,418,957 to Goodyear. While ejectors have no moving parts, and therefore may possess certain advantages as compared to other methods for pressurizing vent gases, ejectors require a minimum primary flow rate to be able to collect lower pressure vent gas. This may complicate their use in variable flow engines or turbine fuel lines. A suitable operating arrangement is desired in order to use an ejector in the engine or turbine fuel supply.

BRIEF DESCRIPTION OF THE DRAWINGS

Specific embodiments of the invention will now be described, by way of example only, with the use of drawings in which.

DETAILED DESCRIPTION

Figure 1:
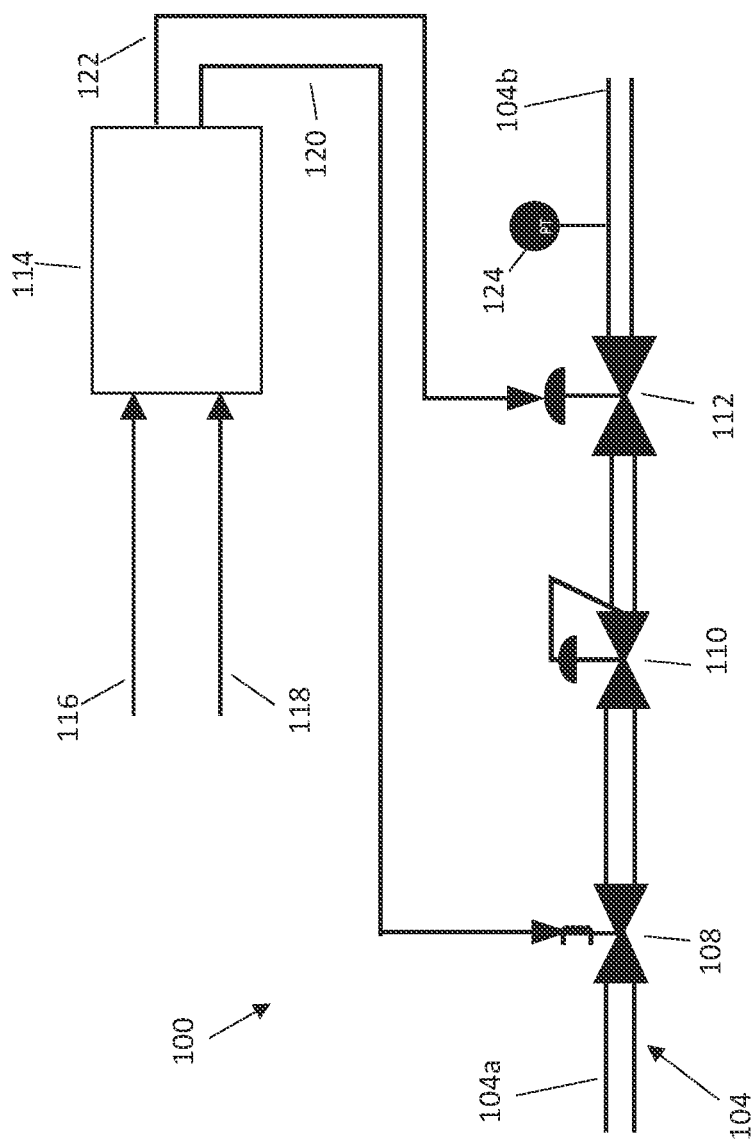
FIG. 1 is a diagrammatic illustration of a typical control circuit used to regulate a combustible gas supply to a unit.

According to one embodiment there is provided a method for introducing vent gas to a unit, the method including: providing combustible gas to a unit through a first fuel line, the first fuel line having a first fuel line control valve disposed thereon; selectively flowing a portion of the combustible gas from the first fuel line through a second fuel line, the second fuel line having a second fuel line control valve disposed thereon; providing the flow from the second fuel line as a primary flow to an ejector; recovering vent gas from an exhaust outlet; providing the vent gas as a secondary flow to the ejector by a vent gas line; and combining an outlet flow from the ejector with the first fuel line.

According to a further embodiment there is provided a control system for regulating introduction of vent gas to a unit, the control system including: a controller adapted to receive a unit set point RPM and an actual unit RPM, the controller adapted to control: a first control valve on the first fuel line; a second control valve on a second fuel line, the second fuel line comprising a selective flow of a portion of the first fuel line and functioning as a primary flow to an ejector; and a vent gas control valve on a vent gas line, the vent gas line functioning as a secondary flow to the ejector, so as to decrease a difference between the actual unit RPM and the unit set point RPM by adjusting fuel flow to the unit by any one or more of the first control valve, the second control valve, and/or the vent gas control valve.

According to yet a further embodiment there is provided an ejector system for introducing vent gas to a unit, the ejector system including: a primary flow of combustible gas controlled by a primary flow control valve; a secondary flow comprised of vent gas; and an outlet flow of gas fluidly connected to a first fuel line, wherein said primary flow consists of a portion of a flow of combustible gas from the first fuel line fluidly connected in parallel with said primary flow, and wherein said first fuel line is selectively controlled by a first fuel line control valve.

The terms "fugitive gases" or "fugitive combustible gases" or "fugitive emissions" or "fugitive gases" or "vent gases" or "vent emissions" are used throughout this specification. The terms are used interchangeably and, by the use of such terms, it is intended to include combustible gases which escape from various apparatuses or which are released deliberately into the atmosphere. Such combustible gases normally exist at or near atmospheric pressure in the vicinity of the sources from where they originate. These vent gases are intended to be collected and to be used as a supplementary fuel supply for an engine which, conveniently, uses combustible gas as its primary fuel supply and which combustible gas is pressurized before entering the engine. The various apparatuses from which the vent gases may escape include compressor cylinder packings, pneumatic instruments, starting gas sources for the engine, gas dehydration units, crankcases, petroleum liquid storage tanks and the like. In many instances the vent gas and combustible fuel gas comprise or consist of natural gas.

In fuel injected engines and gas turbines the speed is controlled by a fuel control valve. When the engine or turbine is stopped, the control valve is closed. During the starting sequence a controller opens the fuel valve according to a programmed start sequence. Once the engine or turbine is stable the fuel valve is opened or closed to maintain a desired speed.

Referring to the drawings, FIG. 1 is a diagrammatic illustration of a typical control circuit 100 used to regulate a combustible gas supply to a unit. The unit may be an engine, a turbine, or any other industrial equipment requiring an influx of combustible gas, or combination of units thereof. In FIG. 1, flow of combustible gas along a fuel line 104 from an upstream portion of the fuel line 104a to a downstream portion of the fuel line 104b and subsequently to the unit (not shown) is controlled by a shut-off valve 108, a pressure regulator 110 and a control valve 112. In general: the shut-off valve 108 may be a manual or solenoid valve, and toggles combustible gas flow to the unit on or off; the pressure regulator 110 controls the pressure of the combustible gas supplied to the unit; and the control valve 112 selectively adjusts the flowrate of the combustible gas to the unit.

A controller 114 receives an actual unit RPM input 116 from the unit, and a set point unit RPM input 118. Control signal 120 may selectively open or close the shut-off valve 108, and control signal 122 may selectively control a degree to which the control valve 112 is opened or closed. During normal operation, if the unit RPM is below the desired value, the controller 114, by means of a pneumatic or electrical signal, for example, causes the control valve 112 to open and supply more fuel to the unit, thereby increasing the RPM of the unit. The opposite occurs if the unit RPM is greater than the desired RPM. The normal range of fuel flow rates to the unit due to load and speed changes may be over a factor of 2, which may cause the fuel pressure at the downstream portion of the fuel line 104b to change substantially.

A pressure transmitter 124 may be located on the downstream portion 104b of the fuel line 104. The fuel pressure after the control valve 112 is normally used for air control. It can also be used to estimate engine fuel flow using the expression:

$$F_f = n * RPM * (b * FP + a)$$

where $F_f$ is the fuel flow,
n is the number of engine cylinders,
RPM is the engine speed in revolutions per minute,
FP is the gauge fuel pressure,
a is a constant, and
b is a constant.

The values of a and b may be determined by fuel flow and fuel pressure measurements at two different engine loads. The values of a and b are subject to the units of these measurements.

Figure 2A:
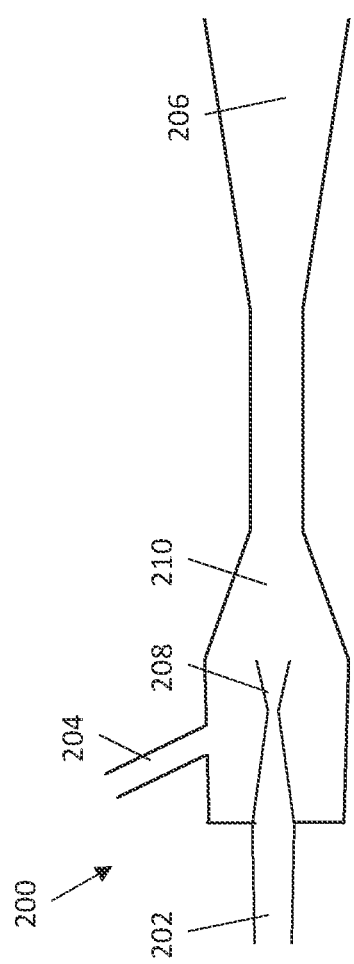
FIG. 2a is a diagrammatic illustration of a typical ejector.

Turning to FIG. 2a, FIG. 2a is a diagrammatic illustration of a typical ejector 200. The ejector 200 has a primary pressurized gas 202 that flows through a reduced area section 208 reaching relatively high velocity. When the primary pressurized gas 202 enters a mixing region 210 some of its momentum is transferred to a lower pressure secondary gas 204 with a resulting mixed flow gas 206 at the outlet.

Figure 2B:
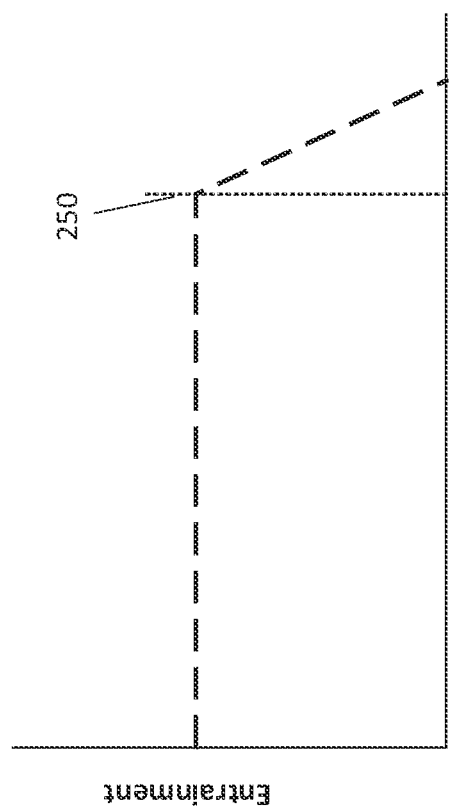
FIG. 2b diagrammatically illustrates the entrainment rate in a given ejector as a function of outlet pressure.

Performance of an ejector may be assessed by calculating an entrainment ratio, which is a mass flow rate of the lower pressure secondary gas 204 divided by a mass flow rate of the primary pressurized gas 202. As shown in FIG. 2b, for a given ejector system an outlet pressure of the mixed flow gas may be increased up to a critical value 250 without materially affecting the entrainment ratio. A further increase of the pressure of the mixed flow gas beyond the critical value 250 decreases the entrainment ratio and eventually reverses the flow of the lower pressure secondary gas.

Because of these design considerations, vent gas ejectors have been used in arrangements where the primary flow rate and pressure changes can be minimized. An example is in the use of the high-pressure gas output from a gas compressor driven by an engine or turbine. Such an arrangement subtracts from the output flow of the gas compressor and is relatively inefficient. In other situations, compressed gas, except for the combustible gas fuel supply, may not be readily available.

Given the above disclosure and with reference to FIG. 1, if an ejector were placed in a fuel supply line in series with the valves 108 and 112, and pressure regulator 110, the pressure upstream of the ejector would need to be increased beyond the available fuel supply pressure to account for the pressure drop across the ejector. Further, flow rate changes encountered in the supply of fuel to the unit because of valves 108 and 112, and pressure regulator 110, may make the desired ejector performance difficult to achieve.

The present invention contemplates placing an ejector in parallel to a main fuel line with appropriate control dynamics to facilitate proper operation of the ejector. Different possible arrangements are described.

Description of a First Embodiment

Figure 3:
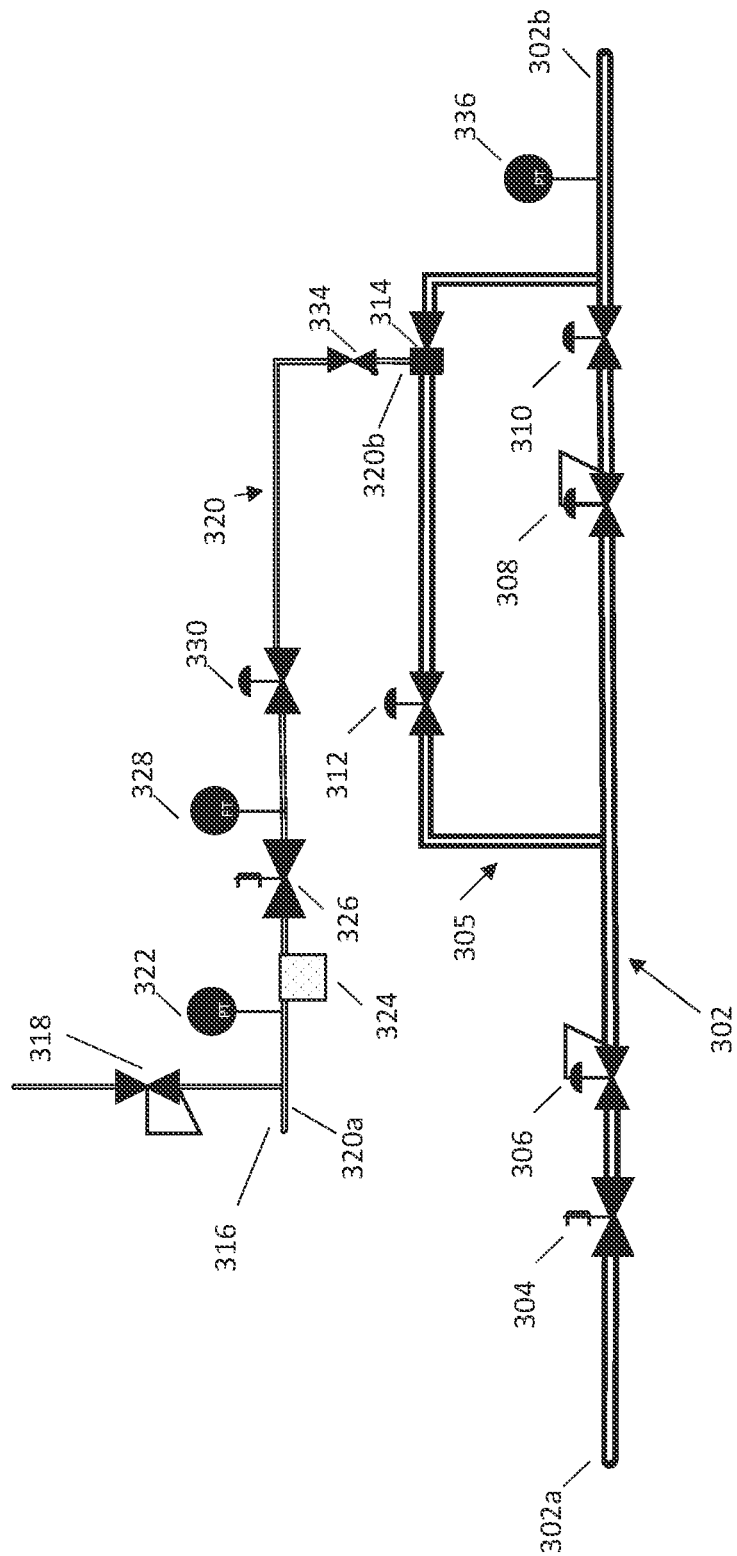
FIG. 3 is a schematic flow diagram of a combustible vent gas supply to a unit, according to one embodiment.

FIG. 3 is a schematic flow diagram of a combustible vent gas supply to a unit, according to one embodiment. In FIG. 3, flow of combustible gas from an upstream portion 302a of a first fuel line 302 to a downstream portion 302b of the first fuel line 302, and subsequently to the unit (not shown) is controlled first by a fuel pressure regulator 306 and a shut-off valve 304. Second fuel line 305 branches from the first fuel line 302. The first fuel line 302 is further controlled by a fuel pressure regulator 308 and a control valve 310. The second fuel line 305 is further controlled by a control valve 312 before providing a primary flow through an ejector 314 and subsequently rejoining with the first fuel line 302. A pressure transmitter 336 is located on the downstream portion 302b of the fuel line 302. Although specific valving and components are listed, other components or arrangements that achieves a similar flow control or monitoring would be readily apparent to those skilled in the art.

Vent gas may be introduced to the system via vent gas source 316. Relief valve 318 may permit venting of vent gas, for example, if the pressure of the vent gas source 316 is too high. Vent gas travels from an upstream portion 320a of a vent gas line 320 to a downstream portion 320b of the vent gas line 320 proximal to the ejector 314. The pressure and flow on the vent gas line 320 are measured by pressure transducer 322 and flow transmitter 328. Filter 324 removes impurities from the vent gas. Shut off valve 326 may selectively toggle vent gas flow to the ejector 314 on or off, and control valve 330 selectively controls the amount of vent gas flow through vent gas line 320 to the ejector 314. In certain embodiments shut off valve 326 and control valve 330 may not be necessary where the pressure in a mixing chamber of the ejector 314 exceeds a pressure of vent gas at the downstream portion 320b of the vent gas line 320, thereby preventing flow of vent gas from vent gas line 320 to the ejector 314. Check valve 334 prevents backflow of fuel gas through vent gas line 320, although other components that prevent backflow of fuel gas through vent gas line 320 may be used.

In the arrangement shown in FIG. 3, the ejector 314 may only be operated when the engine fuel flow rate reaches a pre-set threshold. For example, when the unit is operating at the desired conditions, the shut off valve 326 is opened and the control valve 330 is selectively opened to allow the vent gases to flow to the ejector 314 and thence to the unit fuel. Control valve 312 would then ensure the primary flow to ejector 314 is maintained within the required limits while control valve 310 may maintain the RPM of the unit compared to the RPM set-point. The pressure transmitter 336 may help to ensure the ejector flow conditions are met.

Figure 4:
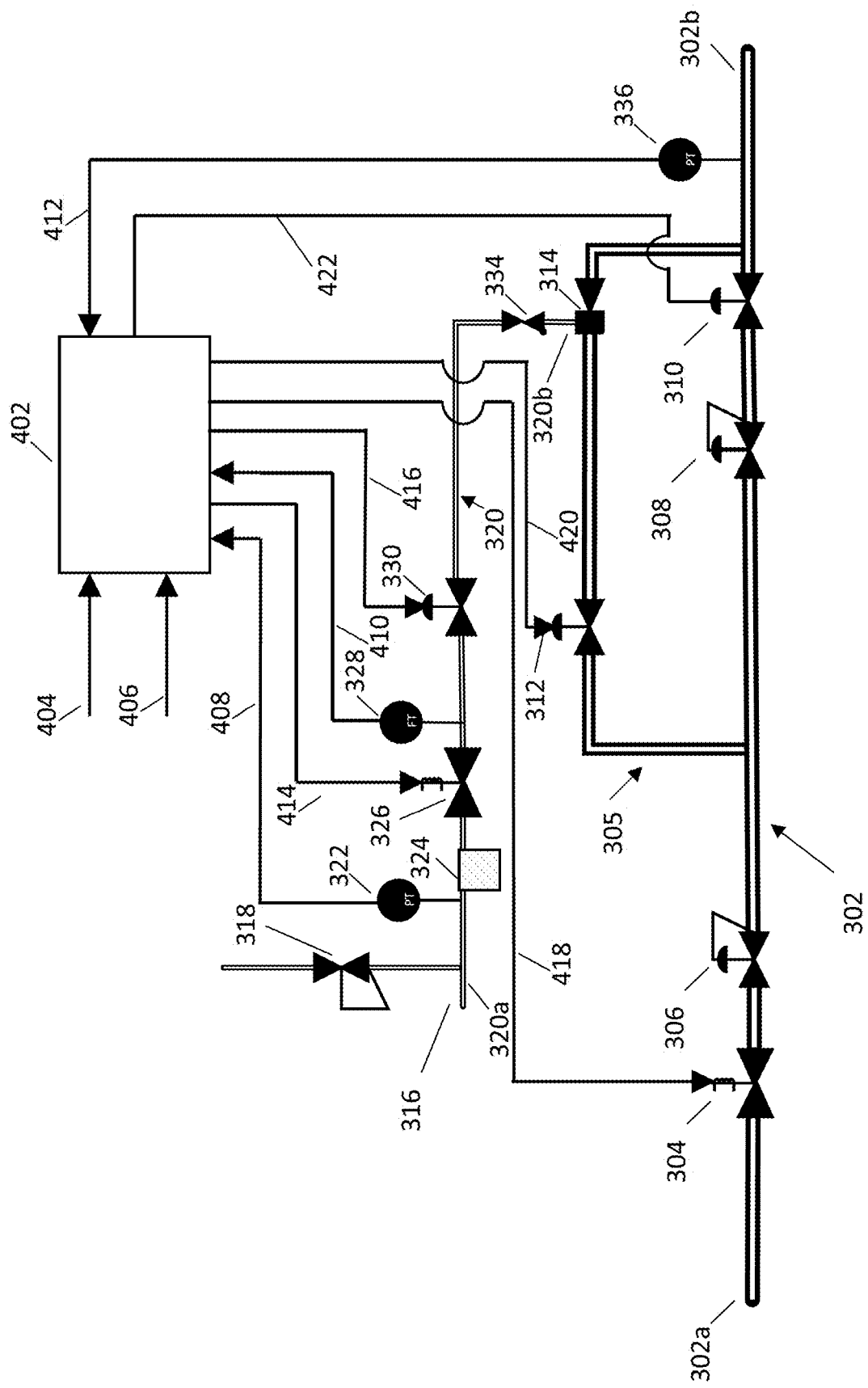
FIG. 4 is a diagrammatic illustration of a control circuit used to regulate a combustible vent gas supply to a unit, according to the embodiment shown in FIG. 3.

FIG. 4 is a diagrammatic illustration of a control circuit used to regulate a combustible vent gas supply to a unit, according to the embodiment shown in FIG. 3. Components that are the same and serve the same function as in FIG. 3 are provided the same reference numerals in FIG. 4. Controller 402 receives an actual unit RPM 404, a unit set point RPM 406, a pressure signal 408 from the pressure transducer 322, a flow signal 410 from the flow transmitter 328, and a pressure signal 412 from the pressure transducer 336. Controller 402 outputs control signal 414 to shut off valve 326, control signal 416 to control valve 330, control signal 418 to shut off valve 304, control signal 420 to control valve 312, and control signal 422 to control valve 310.

Operating Procedure

When the unit is not operating, shut off valves 304 and 326 are closed and any vent gas that is at a pressure greater than the setting of the relief valve 318 escapes to the atmosphere. When the unit is started, the controller 402 opens the shut-off valve 304 for the upstream portion of the fuel line 302a and opens control valve 310 according to the unit starting procedure. After the unit is started and as load is applied and the RPM set point of the unit is increased, the controller 402 causes control valve 310 to open. When either control valve 310 reaches a pre-determined valve open % value or the pressure reading from pressure transmitter 336 reaches a pre-determined value, control valve 312 is ramped open to a pre-determined value causing a flow of combustible gas through the ejector 314. In response to some of the fuel supply flowing through the ejector 314, the controller may partially close the control valve 310 to maintain the desired unit RPM. In the transition period while the flow rate through the ejector 314 is less than the critical flow, the check valve 334 ensures there is no reverse flow of fuel gas to the secondary flow line 320. Once control valve 312 reaches a pre-determined %-open value so that the ejector 314 is operating at the desired flow, the pressure at the secondary inlet to the ejector is less than the pressure of the vent gas and entrainment of the vent gas can occur. As the unit combustible gas fuel supply is commonly available at sufficiently high pressure (typically >500 kPa (g)) the desired flow is likely to be achieved with systems operating in accordance with the disclosure herein. In this state where control valves 310 and 312 are open, control valve 310 may continue to control the unit RPM. As an alternative, where a rate of opening or closing of the control valve 310 is sufficient to minimize fuel flow rate changes to the unit as the ejector flow is turned on or off, control valve 312 may simply be a shut off valve.

Controller logic ensures that the control valve 310 is always able to control engine RPM. The control valve 312 is allowed to open only if the engine fuel flow, as determined by engine fuel pressure and RPM, exceeds a minimum threshold. When the control valve 312 is open and the open percentage of the control valve 310 falls below a specified value needed for good engine RPM control, then the second control valve 312 is closed and the vent gas shutoff valve 326 is closed. A hysteresis factor may be required to distinguish between increasing and decreasing fuel flow rates.

Once the secondary ejector pressure is less than the vent gas pressure, controller 402 first opens the shut off valve 326 and then opens the control valve 330 until the desired pressure measured by the pressure transmitter 322 is achieved or the pre-determined vent gas flow rate as measured by the flow transmitter 328 is achieved. Flow transmitter 328 further ensures that the vent gas flow does not exceed specified limits and provides a measurement of vent gas that is combusted rather than released to the atmosphere. In certain embodiments, a meter-less flow transmitter, such as that description in US Patent Application No. 2021/0364389 to Malm may be employed in place of the flow transmitter 328.

In certain embodiments, the vent gas pressure in the flow line 320b may be less than atmospheric, and therefore it is possible that ambient air may be included with the vent gas. In these embodiments the ratio of the vent gas flow to the ejector 314 may be controlled to be relatively low as compared to the primary flow so that any explosion hazard is appropriately managed.

If the valve open % of the control valve 310 falls below a pre-set value, control valve 312 is closed, shut off valve 326 is closed, and the control valve 330 is closed. If a unit shutdown occurs the shut off valve 304 may also be closed.

Ejector Sizing

To specify the sizing of the ejector 314, the maximum unit fuel flow rate to the unit is determined. The ejector 314 is designed to receive a portion of the maximum unit fuel flow rate depending on the unit fuel usage characteristics. It may be advantageous that the primary flow rate to the ejector 314 does not exceed 80%, preferably does not exceed 50%, of the maximum flow rate to the unit. The flow characteristics for control valves 310, 312 and 330 may be determined using calculated valve flow characteristics.

Description of a Second Embodiment

Figure 5:
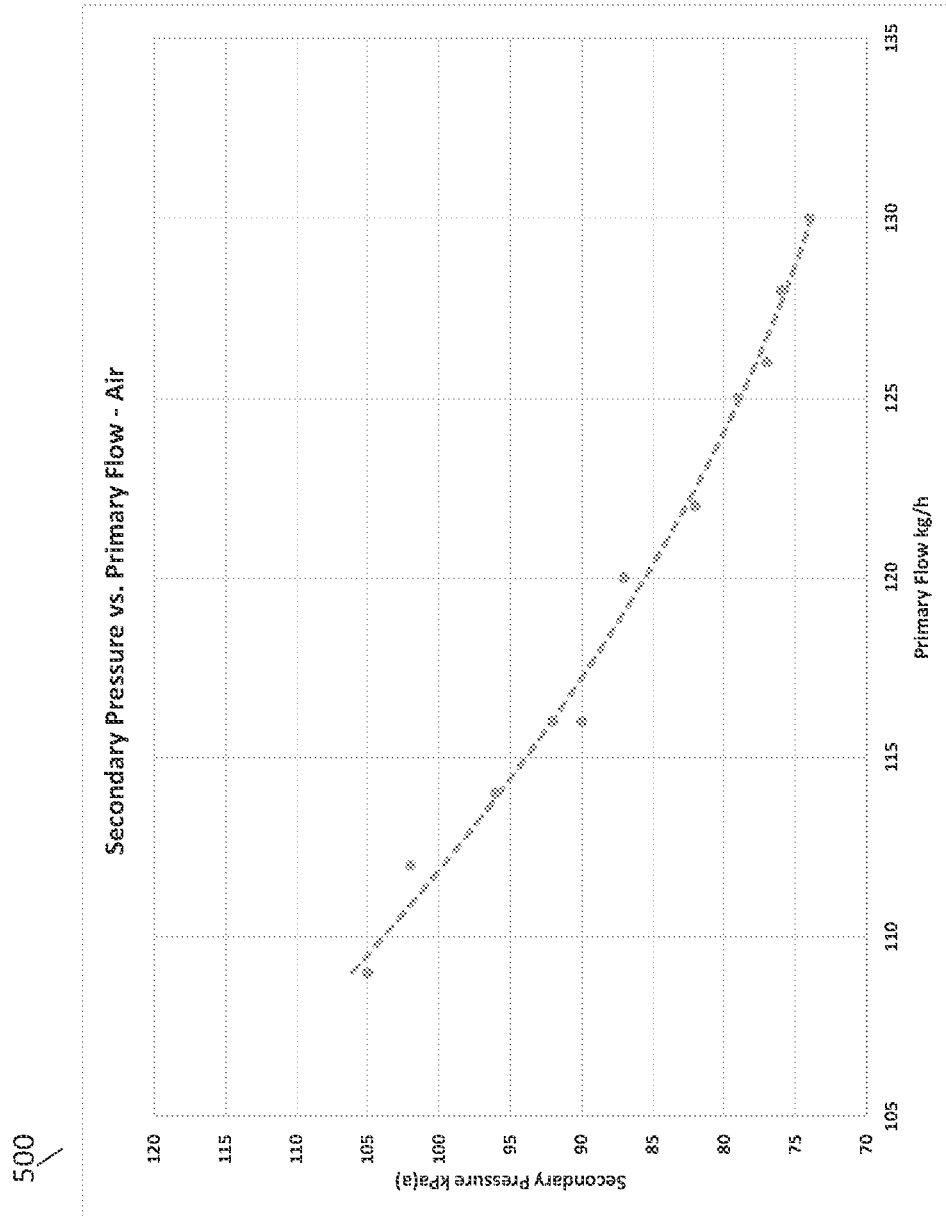
FIG. 5 diagrammatically illustrates the effect of primary flow on secondary pressure of an ejector.

The flow characteristics of an ejector show that the secondary pressure depends on the primary flow rate. An example of this relationship is shown in FIG. 5, which diagrammatically illustrates the effect of primary flow on secondary pressure of an ejector. As seen on the graph 500, as the primary flow increases, the secondary pressure decreases. This behaviour enables an alternative control arrangement shown in a second embodiment of a system as shown in FIG. 6, which is a schematic flow diagram of a combustible vent gas supply to a unit, according to another embodiment.

Figure 6:
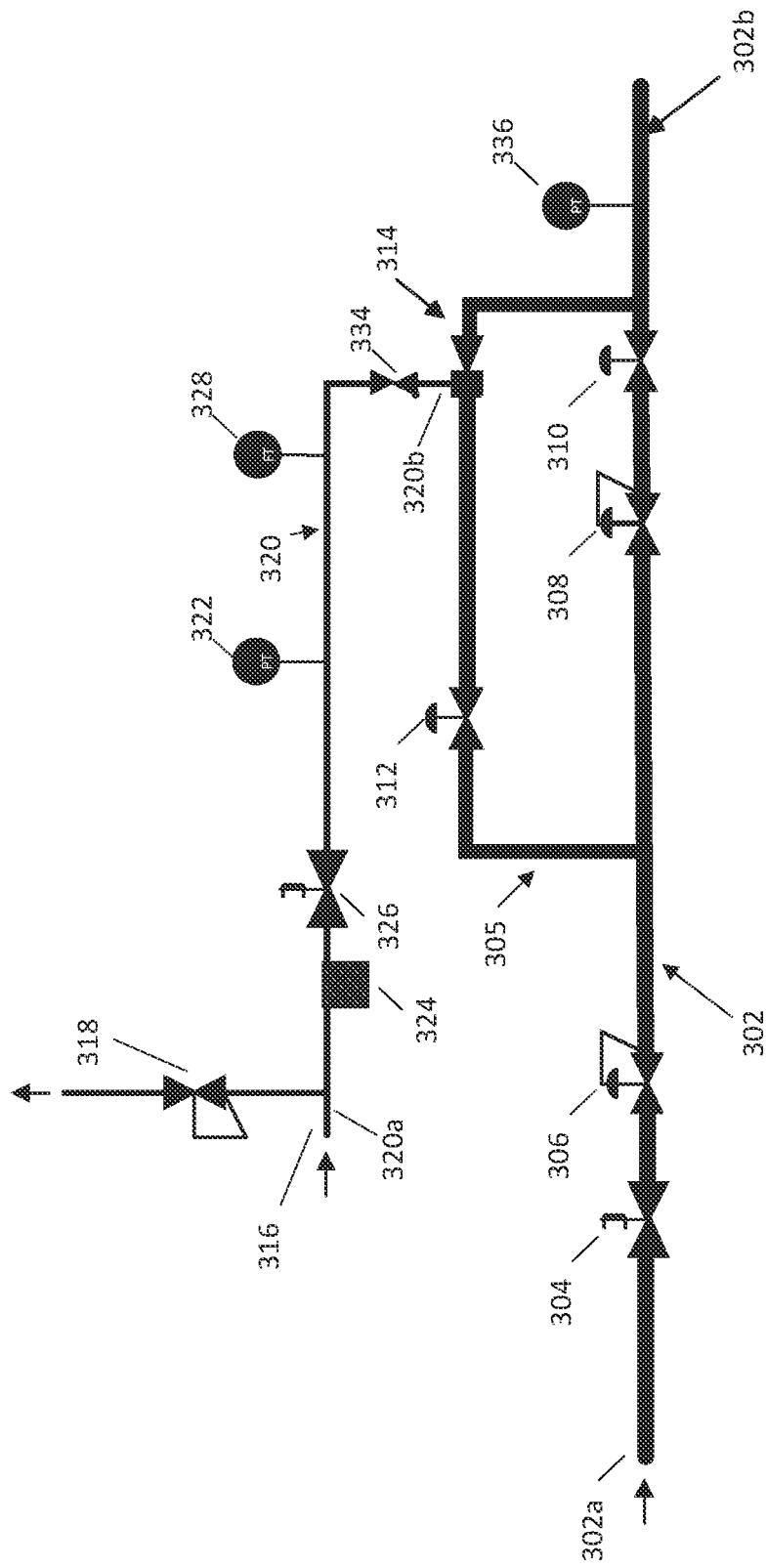
FIG. 6 is a schematic flow diagram of a combustible vent gas supply to a unit, according to another embodiment.

Components of FIG. 6 that are the same and serve the same function as in FIG. 3 are provided the same reference numerals in FIG. 6. Compared to the arrangement shown in FIGS. 3 and 4, in the arrangement shown in FIG. 6 the vent gas control valve 330 has been removed and the pressure transmitter 322 is re-located between the vent gas shut-off 326 and the check valve 334.

In operation, during engine starting and operation at low power the engine speed is controlled by the control valve 310, while control valve 312 is closed. When the fuel flow reaches a pre-specified threshold, the control valve 312 is opened to enable a portion of the fuel to flow through the ejector 314. As the fuel flow through the ejector 314 increases the pressure measured by pressure transmitter 322 decreases from a positive gauge pressure. As the primary flow through the ejector 314 increases, the secondary pressure decreases, as shown with reference to FIG. 5. When the secondary pressure drops to a set-point value that is less than that determined by the vent gas relief valve 318, the solenoid shut-off valve 326 in the vent gas line 320 may be opened to enable the vent gas to flow into the ejector 314. If the pressure at the secondary input of the ejector 314 is less than the vent gas pressure, the vent gas will flow into the ejector and become entrained in the fuel gas. If the pressure at the secondary input of the ejector 314 is greater than the vent gas pressure, the check valve 334 will prevent reverse flow.

Figure 7:
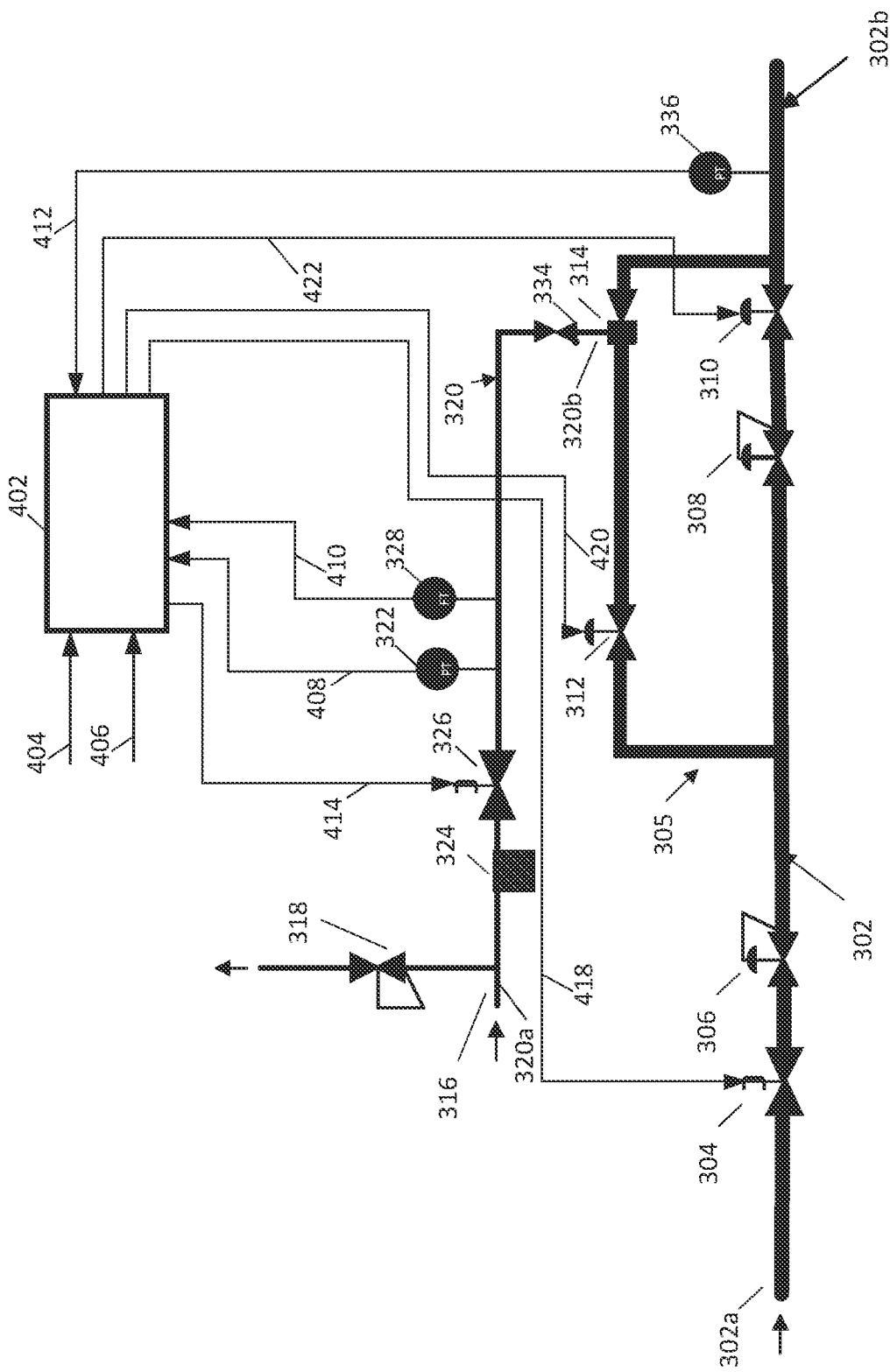
FIG. 7 is a diagrammatic illustration of a control circuit used to regulate a combustible vent gas supply to a unit, according to the embodiment shown in FIG. 6.

FIG. 7 is a diagrammatic illustration of a control circuit used to regulate a combustible vent gas supply to a unit, according to the embodiment shown in FIG. 6. Components of FIG. 7 that are the same and serve the same function as in FIGS. 3, 4, and 6 are provided the same reference numerals in FIG. 7.

Controller logic in controller 402 is arranged such that minimum fuel flow rates are maintained through each of the control valves 310 and 312. During engine start and idle, the control valve 312 is closed and only the control valve 310 is opened and used for RPM control. The control valve 312 may be opened only if the total fuel flow exceeds a pre-specified value which is determined by the minimum flow through the control valve 312 required through the ejector 314 to achieve a pre-set gauge pressure at pressure transmitter 322 plus the minimum flow through control valve 310 to control engine speed. At higher fuel flows control valve 312 is opened to achieve the desired vent gas pressure or the flow through control valve 310 falls below the minimum value needed for engine RPM control. A hysteresis factor may be required to distinguish between increasing and decreasing fuel flow rates.

The pressure measured by pressure transmitter 322 is compared to a set-point pressure by the controller 402. If the vent gas pressure is above the set-point, the controller output increases to open control valve 312 to increase the flow through the ejector 314. If the vent gas pressure is below the set-point, the controller output decreases to close control valve 312 to decrease the flow through the ejector 314. The flow through valve 312 increases until either the vent gas pressure achieves the control set-point or the flow through control valve 310 reaches a minimum set-point.

FIG. 7 shows a flow transmitter 328 in place. The flow transmitter 328 ensures that the vent gas flow does not exceed specified limits and provides a measurement of vent gas that is combusted rather than released to the atmosphere. In place of the flow transmitter shown in FIG. 6 and FIG. 7, the meter-less flow measurement method as described by Malm in US Patent Application No. 2021/0364389 may be employed.

In certain embodiments, the vent gas pressure in the flow line 320b may be less than atmospheric, and therefore it is possible that ambient air may be included with the vent gas. In these embodiments the ratio of the vent gas flow to the ejector 314 may be controlled to be relatively low as compared to the primary flow so that any explosion hazard is appropriately managed.

Description of a Third Embodiment

Figure 8:
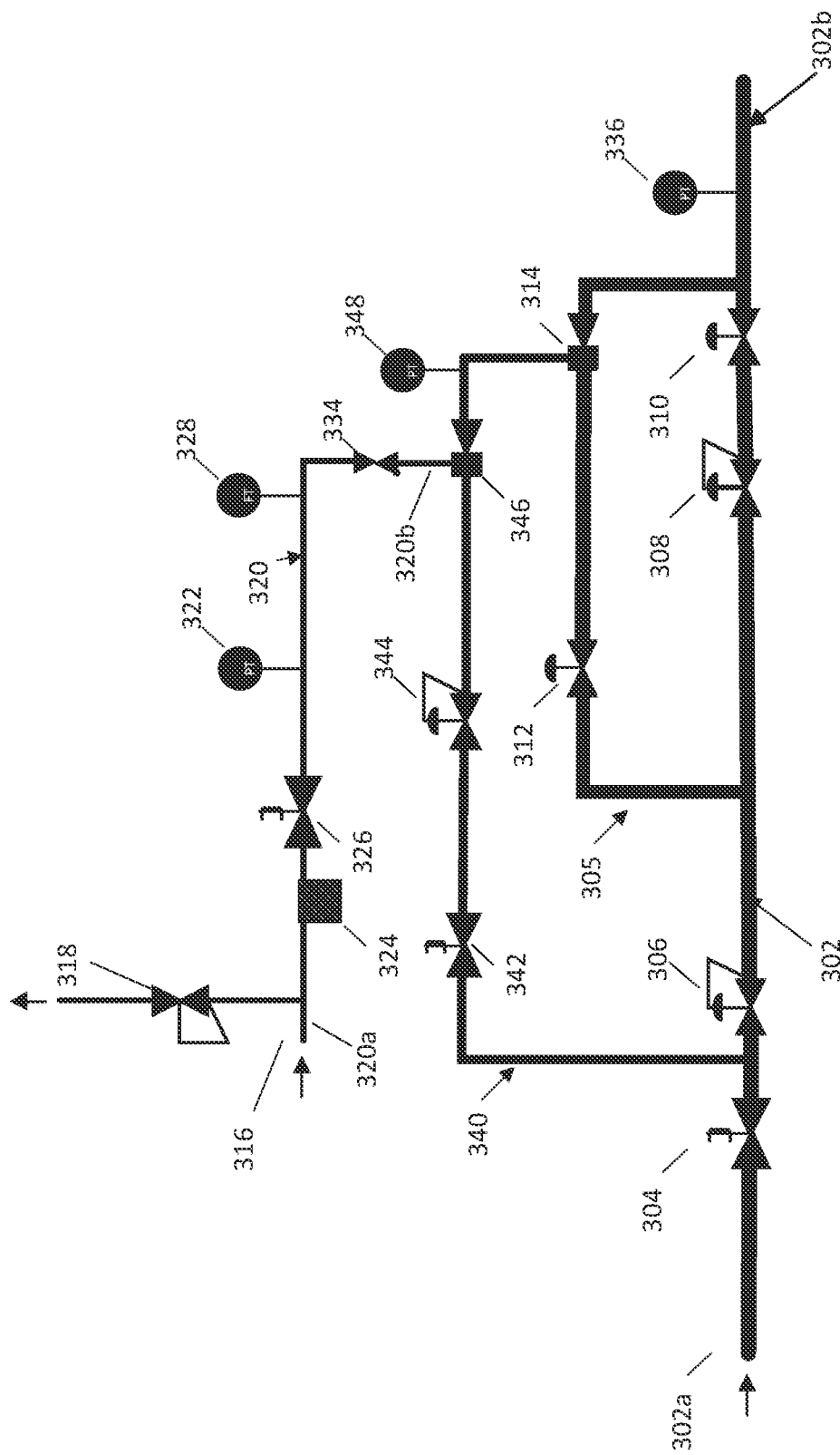
FIG. 8 is a schematic flow diagram of a combustible vent gas supply to a unit, according to another embodiment.

For some engines the fuel pressure required by the engine may exceed the regime where an ejector can generate a sufficiently low secondary pressure. A possible alternative arrangement is the use of two ejectors in a series arrangement. In the series arrangement, the secondary flow from the primary ejector provides the primary flow for the second ejector which operates at a lower pressure. An example is shown in FIG. 8, which is a schematic flow diagram of a combustible vent gas supply to a unit, according to another embodiment. Components of FIG. 8 that are the same and serve the same function as in FIG. 3 and FIG. 6 are provided the same reference numerals in FIG. 8.

As seen in FIG. 8, a third fuel line 340 branches from the first fuel line 302 downstream from the shut off valve 304. The third fuel line 340 is further controlled by a shut-off valve 342 and a fuel pressure regulator 344 before providing a primary flow through a second ejector 346. The outlet flow from the second ejector 346 is provided as secondary flow to the ejector 314, which receives the flow from the second fuel line 305 as a primary flow, and the outlet flow of which is rejoined with the first fuel line 302. Although specific valving and components are listed, other components or arrangements that achieves a similar flow control or monitoring would be readily apparent to those skilled in the art.

In the arrangement shown in FIG. 8, initially shut-off valves 342 and 326 are closed. As with the control method of FIG. 7, after engine start and loading the engine fuel manifold pressure reaches a pre-determined value. Then control valve 312 is ramped open to increase the flow through the ejector 314. Control valve 312 is initially opened until the pressure measured at a pressure transmitter 348 falls below a pre-determined threshold. Then shut-off valve 342 is opened to enable gas to flow through the second ejector 346. This gas flow causes pressure measured by pressure transmitter 322 to fall. The control system serves to increase the flow through ejector 314, which in turn decreases the pressure measured by pressure transmitter 348 and decreases the secondary pressure into the second ejector 346. The vent gas shut-off valve 326 may then be opened to provide secondary flow to the second ejector 346.

Control Method

Figure 9:
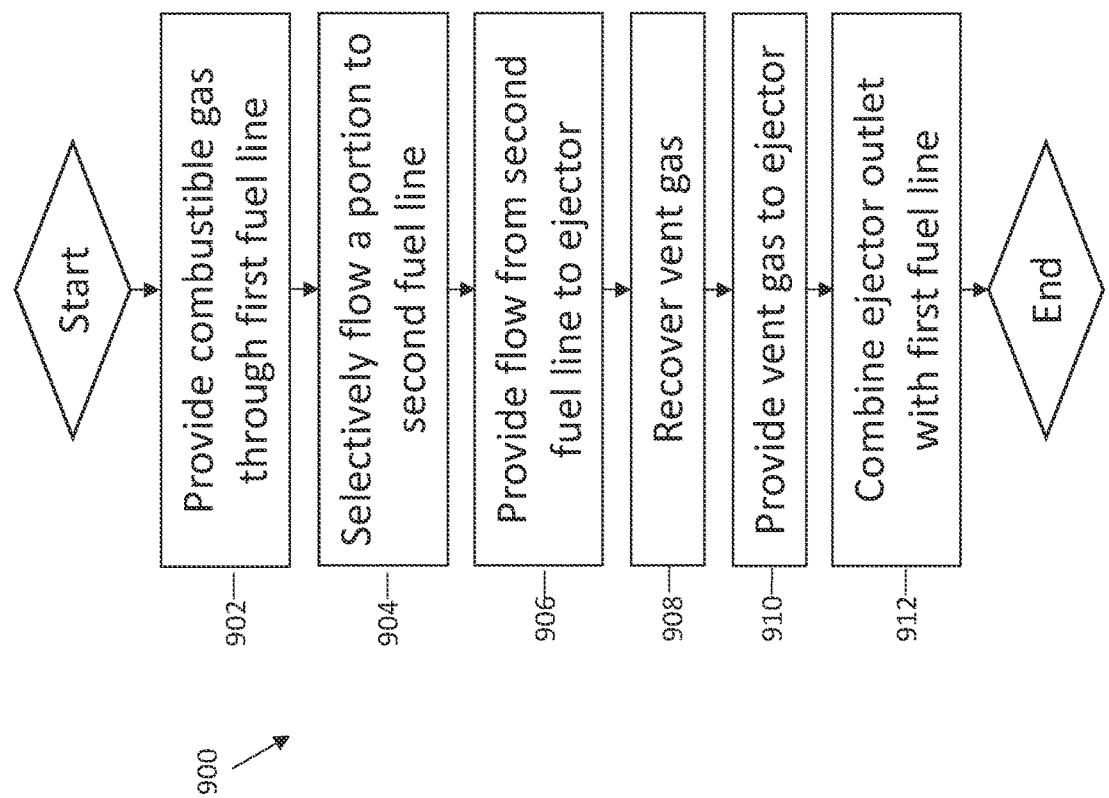
FIG. 9 is a flowchart of a method of introducing vent gas to a unit, according to one embodiment.

FIG. 9 is a flowchart of a method 500 of introducing vent gas to a unit, according to one embodiment. Step 902 includes providing combustible gas to a unit through a first fuel line, the first fuel line having a first fuel line control valve disposed thereon. Step 904 includes selectively flowing a portion of the combustible gas from the first fuel line through a second fuel line, the second fuel line having a second fuel line control valve disposed thereon. Step 906 includes providing the flow from the second fuel line as a primary flow to an ejector. Step 908 includes recovering vent gas from an exhaust outlet. An exhaust outlet may be the unit exhaust or may be another source of vent gas such as seal leakage. Step 910 includes providing the vent gas as a secondary flow to the ejector by a vent gas fuel line. Step 912 includes combining an outlet flow from the ejector with the first fuel line.

As described with reference to the arrangement shown in FIG. 8 for example, in certain embodiments the method 900 may further comprise selectively flowing a portion of the combustible gas from the first fuel line through a third fuel line and providing the flow from the third fuel line as a primary flow to a second ejector. The vent gas recovered at step 908 is provided as a secondary flow to the second ejector, and the outlet flow from the second ejector (including the vent gas) is provided as the secondary flow to the ejector at step 910. With the series arrangement of ejectors, the method may further comprise measuring a secondary pressure of the ejector, selectively flowing the portion of the combustible gas from the first fuel line through the third fuel line when the secondary pressure of the ejector falls below a first pre-determined threshold, measuring a secondary pressure of the second ejector, and providing the vent gas as the secondary flow to the second ejector when the secondary pressure of the second ejector falls below a second pre-determined threshold.

In certain embodiments the method 900 may further include controlling the rate of fuel to the unit by selectively manipulating either the first fuel line control valve, the second fuel line control valve or both control valves. The method 900 may also include measuring the flow of the vent gas to the ejector with a view to manipulating a control valve on the vent gas fuel line, manipulating a control valve on the second fuel line or both. When the valve on the vent gas fuel line and/or the second fuel line are manipulated, a control valve on the first fuel line may be correspondingly manipulated to maintain a constant supply of combustible gas to the unit.

In certain embodiments, the method 900 may include the steps of selectively venting a portion of the vent gas before the step of providing the vent gas as a secondary flow to the ejector and/or preventing flow of the combustible gas from the second fuel line to the vent gas line by a check valve.

Application to Gas Compressors

The ejector control methods as described above may also be applied to some gas compressors where the primary flow to the ejector comes from the pressurized discharge gas and the flow from the ejector outlet flows to the compressor suction gas flow. The arrangement for a single ejector is shown is shown in FIG. 10, which is a schematic flow diagram of a vent gas supply to a gas compressor, according to one embodiment.

Figure 10:
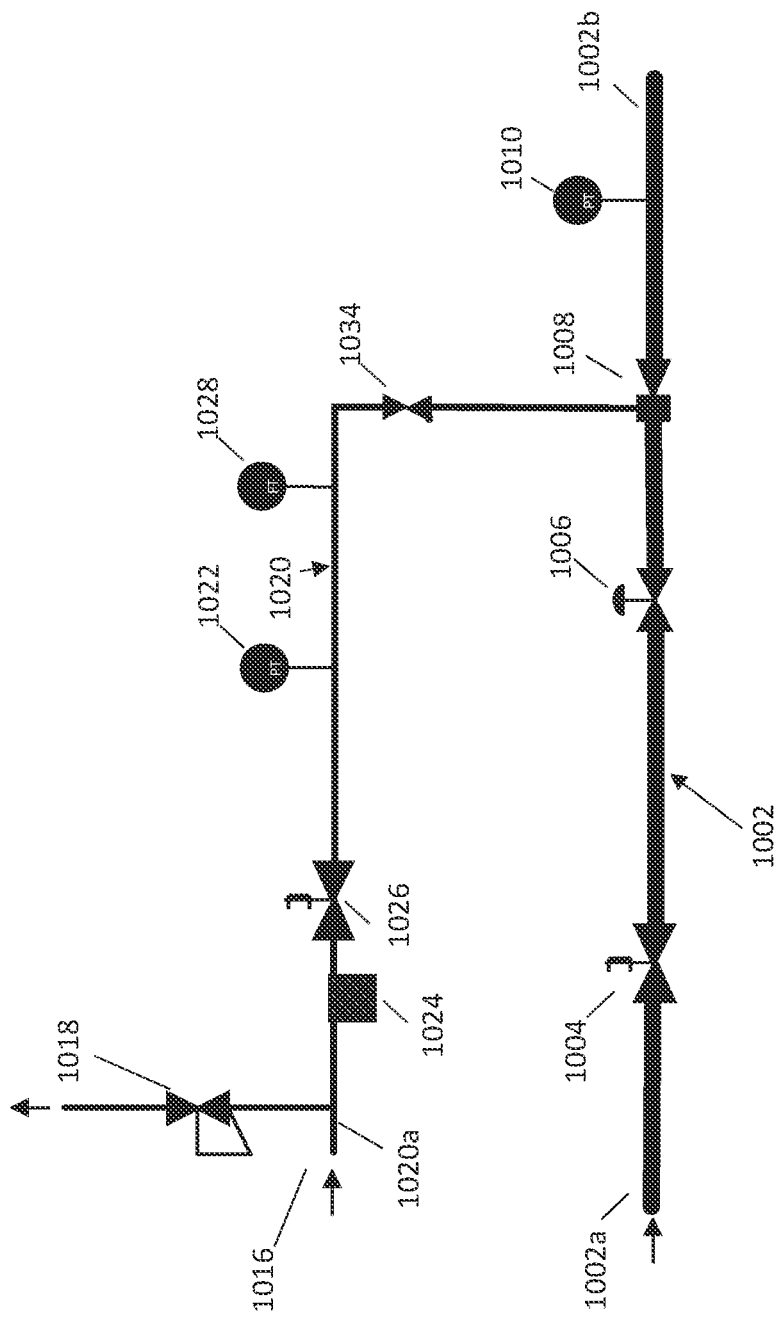
FIG. 10 is a schematic flow diagram of a vent gas supply to a gas compressor, according to one embodiment.

In FIG. 10, flow of pressurized discharge gas from an upstream portion 1002a of a first gas line 1002 to a downstream portion 1002b of the first gas line 1002, and subsequently to the gas compressor suction (not shown) is controlled by a shut-off valve 1004 and control valve 1006 before being provided as a primary flow through an ejector 1008. A pressure transmitter 1010 is located on the downstream portion 1002b of the gas line 1002. Although specific valving and components are listed, other components or arrangements that achieves a similar flow control or monitoring would be readily apparent to those skilled in the art.

Similar to the arrangements for fuel line ejectors, vent gas may be introduced to the system via vent gas source 1016. Relief valve 1018 may permit venting of vent gas, for example, if the pressure of the vent gas source 1016 is too high. Vent gas travels from an upstream portion 1020a of a vent gas line 1020 to a downstream portion 1020b of the vent gas line 1020 proximal to the ejector 1008. The pressure and flow on the vent gas line 1020 are measured by pressure transducer 1022 and flow transmitter 1028. Filter 1024 removes impurities from the vent gas. Shut off valve 1026 may selectively toggle vent gas flow to the ejector 1008 on or off. A control valve may or may not be implemented on the vent gas line 1020. Check valve 1034 prevents backflow of gas through vent gas line 1020, although other components that prevent backflow of gas through vent gas line 1020 may be used.

In the arrangement of FIG. 10, the control valve 1006 controls the primary flow through the ejector 1008. When the ratio of the compressor discharge pressure to the suction pressure exceeds a value based on the ejector performance, the control valve 1006 may be opened to allow the motive gas to flow through the ejector 1008. As the flow rate increases, the pressure observed by pressure transmitter 1022 decreases. When the pressure measured by pressure transmitter 1022 falls below the desired vent gas setpoint, the vent gas shut-off valve 1026 may be opened to enable vent gas to be entrapped by the ejector 1008.

Since the motive gas flow rate is only sufficient to maintain the vent gas pressure to the desired value, there is minimal loss of energy of the compressor discharge gas. Hence the arrangement shown in FIG. 10 uses the ejector in the most efficient manner.

An arrangement comprising multiple ejectors in series may also be implemented, similar to that described with reference to FIG. 8 for example.

Control Method

Figure 11:
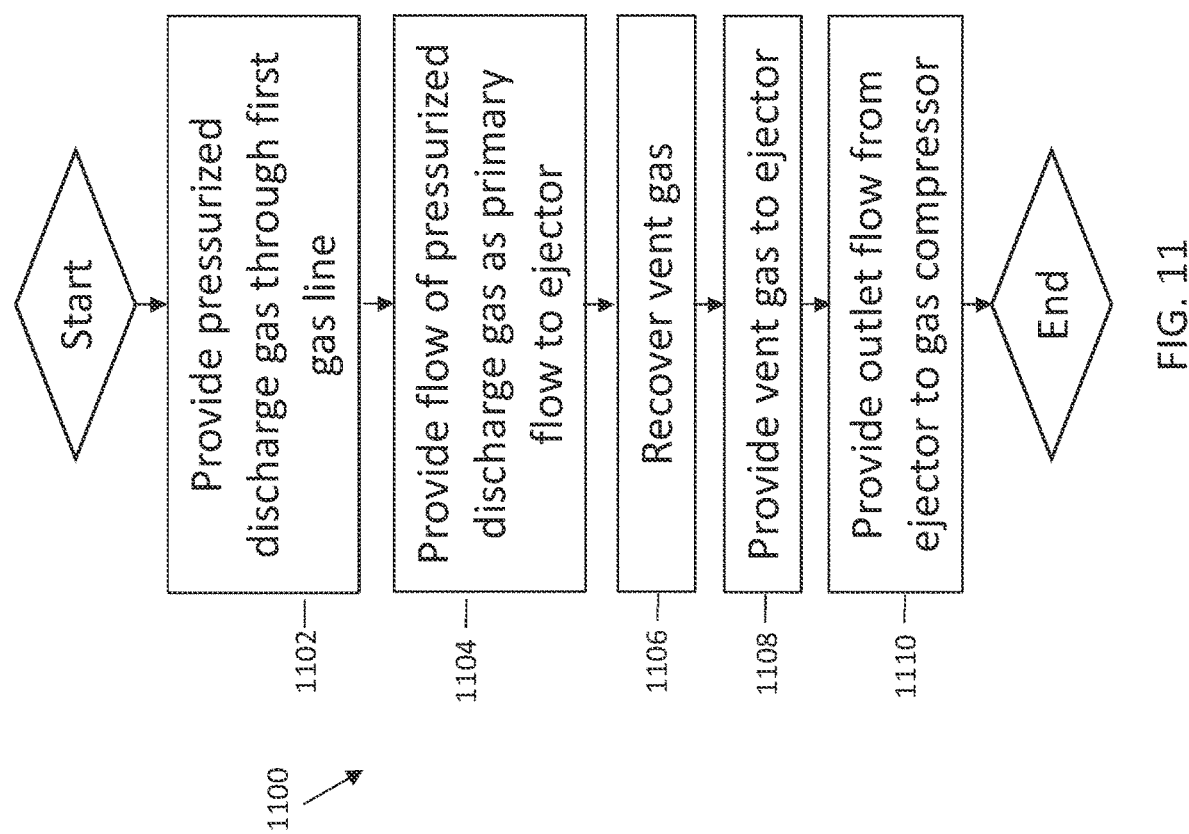
FIG. 11 is a flowchart of a method of introducing vent gas to a gas compressor, according to one embodiment.

FIG. 11 is a flowchart of a method 1100 of introducing vent gas to a gas compressor, according to one embodiment. Step 1102 includes providing pressurized discharge gas through a first gas line, the first gas line having a first gas line control valve disposed thereon. Step 1104 includes providing the flow of pressurized discharge gas from the first gas line as a primary flow to an ejector. Step 1106 includes recovering vent gas from an exhaust outlet. An exhaust outlet may be the unit exhaust or may be another source of vent gas such as seal leakage. Step 1108 includes providing the vent gas as a secondary flow to the ejector by a vent gas line. Step 1110 includes providing an outlet flow from the ejector to the gas compressor.

In certain embodiments, the method 1100 may further comprise measuring a secondary pressure of the ejector, and providing the vent gas as the secondary flow to the ejector when the secondary pressure of the ejector falls below a pre-determined threshold.

Many further modifications will readily occur to those skilled in the art to which the invention relates and the specific embodiments herein described should be taken as illustrative of the invention only and not as limiting its scope as defined in accordance with the accompanying claims.

I claim:

1. A method for introducing vent gas to a unit, the method comprising:
   providing combustible gas to a unit through a first fuel line, the first fuel line having a first fuel line control valve disposed thereon;
   selectively flowing a portion of the combustible gas from the first fuel line through a second fuel line, the second fuel line having a second fuel line control valve disposed thereon;

providing the flow from the second fuel line as a primary flow to an ejector;
recovering vent gas from an exhaust outlet;
providing the vent gas as a secondary flow to the ejector by a vent gas line; and
combining an outlet flow from the ejector with the first fuel line.

2. The method according to claim 1, the method further comprising the step of controlling the rate of fuel to the unit by selectively manipulating the first fuel line control valve.

3. The method according to claim 1, the method further comprising the step of controlling the rate of fuel to the unit by selectively manipulating the second fuel line control valve.

4. The method according to claim 1, the method further comprising controlling the rate of vent gas introduced to the unit by:
measuring the flow of the vent gas to the ejector; and
manipulating a control valve on the vent gas line.

5. The method according to claim 1, the method further comprising controlling the rate of vent gas introduced to the unit by:
measuring the pressure of the combustible gas provided to the unit; and
manipulating a control valve on the second fuel line.

6. The method according to claim 4, the method further comprising the step of correspondingly manipulating the first fuel line control valve to maintain a supply of combustible gas to the unit.

7. The method according to claim 5, the method further comprising the step of correspondingly manipulating the first fuel line control valve to maintain a supply of combustible gas to the unit.

8. The method according to claim 1, the method further comprising the step of selectively venting a portion of the vent gas before the step of providing the vent gas as a secondary flow to the ejector.

9. The method according to claim 1, the method further comprising the step of preventing flow of the combustible gas from the second fuel line to the vent gas line by a check valve on the vent gas line.

10. The method according to claim 1, further comprising:
selectively flowing a portion of the combustible gas from the first fuel line through a third fuel line;
providing the flow from the third fuel line as a primary flow to a second ejector;
providing the vent gas as a secondary flow to the second ejector by the vent gas line;
providing the outlet flow from the second ejector as the secondary flow to the ejector.

11. The method according to claim 10, further comprising:
measuring a secondary pressure of the ejector;
selectively flowing the portion of the combustible gas from the first fuel line through the third fuel line when the secondary pressure of the ejector falls below a first pre-determined threshold;
measuring a secondary pressure of the second ejector; and
providing the vent gas as the secondary flow to the second ejector when the secondary pressure of the second ejector falls below a second pre-determined threshold.

12. A control system for regulating introduction of vent gas to a unit, the control system comprising:
a controller adapted to receive a unit set point RPM and an actual unit RPM, the controller adapted to control:
a first control valve on a first fuel line;
a second control valve on a second fuel line, the second fuel line comprising a selective flow of a portion of the first fuel line and functioning as a primary flow to an ejector; and
a vent gas shut-off valve on a vent gas line, the vent gas line providing a vent gas flow as a secondary flow to the ejector,
so as to provide vent gas as the secondary flow to the ejector by controlling the second control valve and the vent gas shut-off valve, while controlling the actual unit RPM to the unit set point RPM by adjusting fuel flow to the unit by any one or more of the first control valve, the second control valve, and/or the vent gas control valve.

13. The control system according to claim 12, wherein the controller is further adapted to control a vent relief valve on the vent gas line to selectively vent a portion of the vent gas.

14. The control system according to claim 12, wherein the controller is further adapted to control a vent gas control valve on the vent gas line.

15. The control system according to claim 14, wherein the controller is further adapted to control the vent gas control valve based on a flow rate received from a flow transmitter on the vent gas line.

16. The control system according to claim 14, wherein the controller is further adapted to control the vent gas control valve based on the pressure of the first fuel line to the unit.

17. The control system according to claim 12, wherein the controller is further adapted to control a shut-off valve on the first fuel line.

18. The control system according to claim 12, wherein the controller is further adapted to control a shut-off valve on a third fuel line, the third fuel line comprising a selective flow of a portion of the first fuel line and functioning as a primary flow to a second ejector, wherein the vent gas line provides a secondary flow to the second ejector, and an outlet flow from the second ejector is provided as the secondary flow to the ejector.

19. An ejector system for introducing vent gas to a unit, the ejector system comprising:
a primary flow of combustible gas controlled by a primary flow control valve;
a secondary flow comprising vent gas; and
an outlet flow of gas fluidly connected to a first fuel line, wherein
said primary flow consists of a portion of a flow of combustible gas from the first fuel line fluidly connected in parallel with said primary flow, and wherein said first fuel line is selectively controlled by a first fuel line control valve.

20. The ejector system of claim 19, wherein the secondary flow comprises ambient air.

21. The ejector system of claim 20, wherein said secondary flow is controlled by a vent gas control valve to reduce risk of explosion.

22. The ejector system of claim 21, wherein the primary flow is less than 80% of the combined flow of the outlet flow and the flow of the first fuel line.

23. A method of introducing vent gas to a gas compressor, comprising:
providing pressurized discharge gas through a first gas line, the first gas line having a first gas line control valve disposed thereon;
providing the flow of pressurized discharge gas from the first gas line as a primary flow to an ejector;
recovering vent gas from an exhaust outlet;

providing the vent gas as a secondary flow to the ejector by a vent gas line; and providing an outlet flow from the ejector to the gas compressor.

24. The method of claim 23, further comprising measuring a secondary pressure of the ejector, and providing the vent gas as the secondary flow to the ejector when the secondary pressure of the ejector falls below a pre-determined threshold.

* * * * *